INVENTOR.
ELIA BARATTO
BY W.E. Beatty
ATTORNEY though only exemplary, embodiment, with reference to the accompanying drawings, wherein:

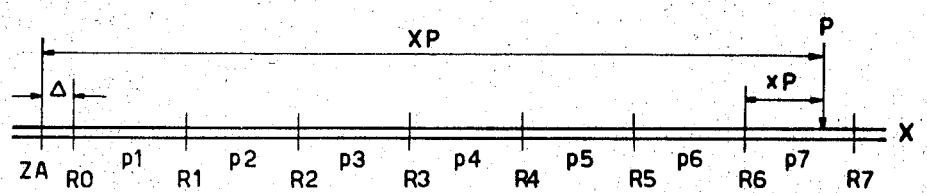
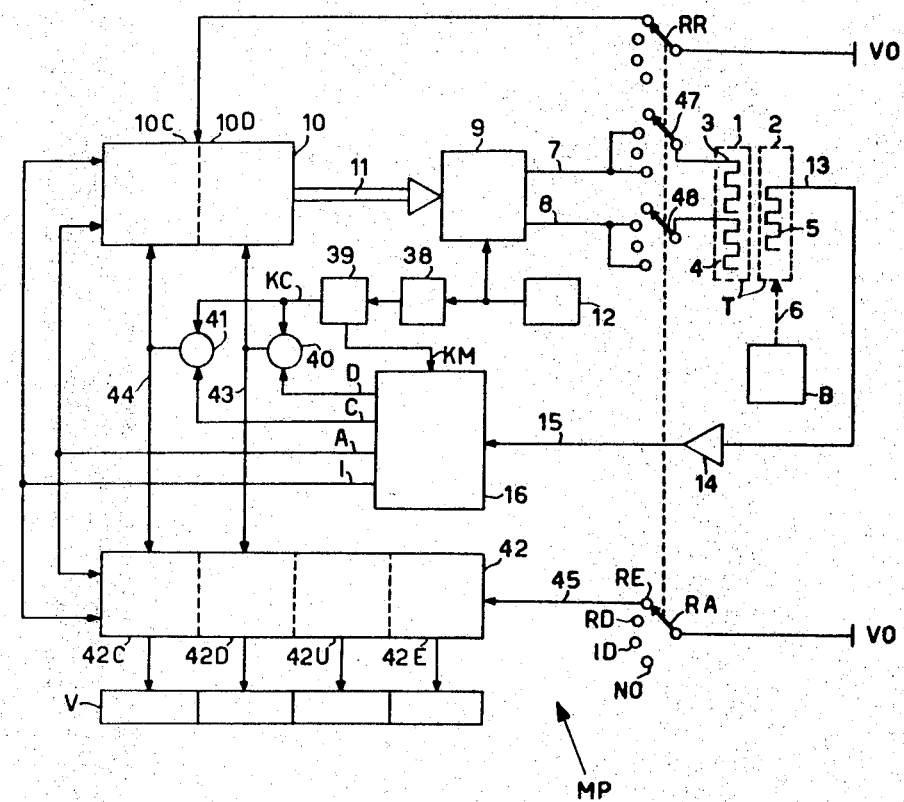

United States Patent Office 3,537,102
Patented Oct. 27, 1970

3,537,102
DIGITAL POSITION MEASURING DEVICE
Elia Baratto, Banchette, Italy, assignor to Ing. C. Olivetti
& C., S.p.A., Ivrea, Italy, an Italian corporation
Filed Apr. 12, 1967, Ser. No. 630,432
Claims priority, application Italy, Apr. 12, 1966,
9,147/66
Int. Cl. H03k 13/02
U.S. Cl. 340—347                                    3 Claims

ABSTRACT OF THE DISCLOSURE

In a digital position measuring device adapted to measure the displacement of a member, movable with respect to a fixed member along an axis provided with a series of position zeros spaced by a constant pitch, the digital contents of a first counter, representing the relative position of the movable member within each of said pitches, are converted into analog form and compared with an analog magnitude representing the present position of the movable member for supplying an error signal which controls the application of counting pulses to said first counter and simultaneously to a second counter connected to a display device of its digital contents, and means for transferring the digital contents of said first counter in said second counter in order to allow the representation in said display device of said relative position of the movable member staying within one of said pitches.

BACKGROUND OF THE INVENTION

The present invention relates to improvements to the digital position measuring device described in patent application Ser. No. 493,336 filed by the applicant and another on Oct. 6, 1965.

According to the referenced patent application the digital position measuring device for measuring the displacement of a movable member with respect to a fixed member comprises an internal counter whose digital contents, converted into analog form, are continuously compared with an analog magnitude representing the present position of the movable member for supplying an error signal which controls the application of counting pulses to said counter, this latter being able to selectively operate at different counting speeds depending upon the speed of said movable member.

In digital position measuring device according to the embodiment described in the referenced patent application, said analog comparison and the generation of said error signal are carried out by a cyclic position measuring transformer and the internal counter is arranged to supply a digital indication of the present position of the movable member within the extent of each cycle of the position measuring transformer. Furthermore said digital position measuring device comprises an external counter, controlled by the same counting pulses applied to the internal counter, and constituted by a number of stages which is higher than the number of stages of the internal counter, and therefore also apt to operate as a counter totalizing the counting cycles of the internal counter.

Therefore, due to the structure of the position measuring transformer, which comprises a plurality of position zeros separated by a constant pitch, the internal counter supplies a digital position indication which relates to one of said pitches.

Moreover, according to the embodiment described in the referenced patent application, the external counter is provided with means for resetting to zero or for modifying its digital contents, independently from the internal counter.

Therefore, the external counter is able to supply a digital position indication with respect to the absolute zero position of the machine or with respect to another zero position of the machine chosen at pleasure.

Since in the common applications (e.g., to inspect the dimensions of a workpiece or to position the movable member of a machine on predetermined positions) it is generally necessary to control the magnitudes of the coordinates along a plurality of axes, in order not to excessively complicate the digital indication reading panels and chiefly not to increase the total cost of the equipment, the digital position measuring devices employed therein are of the type described in the referenced patent application (more precisely one thereof for each displacement axis of the machine), and are provided with a single display device for reading the contents of the external counter.

As already explained in the referenced patent application, when the indications of the absolute counter (and therefore of the visualizer) should be referred to the absolute zero position of the machine, the movable member should be first displaced into said position, which is recognizable due to the fact that the digital position measuring device is provided with means for indicating the alignment of the movable member with said absolute reference position. In this condition the external counter is reset to zero. If then the movable member starts moving, the digital indications supplied by the visualizer identify the absolute coordinates of each position reached by said movable member.

By means of an analogous procedure another zero position of the machine may be chosen, starting from which the coordinates of the individual positions reached by said movable member may be measured.

In some cases however it is also useful to recognize the relative position of the movable member within the extent of one pitch of the position measuring transformer, namely the contents of the internal counter.

In the digital position measuring device described in the referenced patent application it is possible to obtain said magnitude by means of a subtraction operation carried out by the operator.

With reference to the FIG. 1 of the accompanying drawings, assumption is made that ZA is the absolute zero position for the displacements of the movable member along the axis X, and that R0, R1, R2 . . . R7 . . . are the zero positions which define the origins of the successive pitches $p1, p2 \ldots p7 \ldots$ respectively, of the position measuring transformer. It is assumed that all said pitches are equal and of known magnitude $p$. It is moreover assumed that $\Delta$ is the distance of the absolute zero ZA from the original R0 of the next pitch; the distance $\Delta$ is a constructional datum of the machine and therefore it is known. It is finally assumed that P is the present position of the movable member and that XP, $xP$ are the coordinate of the position P, measured with reference to the origin ZA, and that $xP$ is the relative coordinate measured with respect to R6 (origin of the pitch $p7$ wherein the position P is comprised). Therefore the following relations are to be considered:

$$XP = n \cdot p + \Delta + xP \quad (1)$$
$$xP = XP - (\Delta + n \cdot p) \quad (2)$$

wherein $n$ represents the number of the whole pitches comprised between the positions R0 and P.

With reference to the relation (2), the operator registers the digital indication of the visualizer (XP) and then he subtracts a quantity $(6p+\Delta)$ equal to the distance between the absolute zero of the machine ZA and the relative zero R6 representing the origin of the pitch $p7$ wherein the position P of the movable member is comprised.

The quantity to be subtracted is a datum easily deducible by the operator. In fact Δ and p are known, while to know n it will be sufficient to count on the digital position measuring device the number of whole pitches comprised between R0 and P.

However, these operations require time and skill for the operator. Moreover, it is required that the digital position measuring devices are able to rebuild the indication of a position when it was destroyed owing to current droppings, or because the equipment was held deenergized throughout a certain period of time, without displacing the movable member.

The above mentioned disadvantages are obviated and the above mentioned objects are obtained in the digital position measuring device according to the invention.

SUMMARY OF THE INVENTION

The digital position measuring device according to the invention, able to measure the displacement of a member, movable with respect to a fixed member along an axis provided with a series of position zeros spaced by a constant pitch, comprises a first counter whose digital contents, representing the relative position of the movable member within each of said pitches, are converted into analog form in order to be continuously compared with an analog magnitude representing the present position of the movable member for supplying an error signal, which controls the application of counting pulses to said first counter and simultaneously to a second counter, which is able to count in a manner identical to the first counter and is connected to a device for displaying of its digital contents, and is characterized in that means are provided for transferring the digital contents of said first counter into said second counter in order to allow, through said display device, a representation in a visual digital form of said relative position of the movable member within the current occupied of one of said pitches.

This and other characteristics of the invention will clearly appear from the following description of two preferred embodiments, made by way of example and not in a limiting sense, with reference to the accompanying drawings.

BRIEF DESCRIPTION OF THE DRAWINGS

FIG. 1 represents the disposition of the position zeros along a displacement axis of the digital position measuring device according to the invention;

FIG. 2 represents a block diagram of the circuits of a first embodiment of said digital position measuring device according to the invention;

DESCRIPTION OF THE PREFERRED EMBODIMENTS OF THE INVENTION

Figure 3:
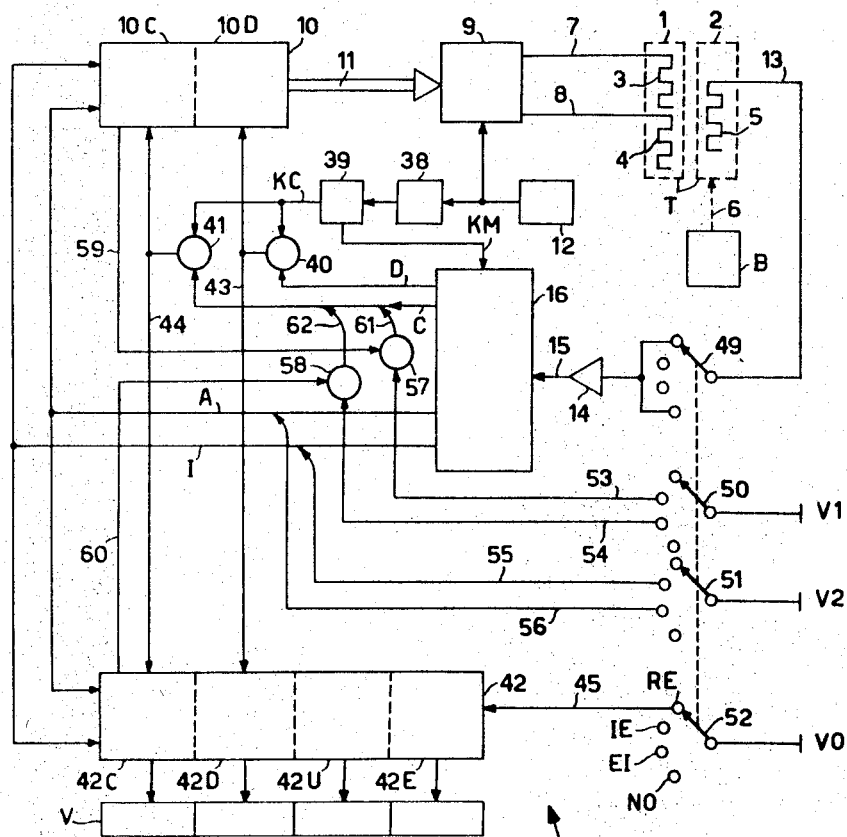
FIG. 3 represents a block diagram of the circuits of a second embodiment of said digital position measuring device according to the invention.

According to a first embodiment of the invention illustrated in FIG. 2, the digital position measuring device MP is the one described in the referenced patent application, with the addition of some modifications which realize the objects of the present patent application.

In FIG. 2, the digital position measuring device MP includes a position transducer T, having a fixed part I connected to a fixed member, for instance to the framework of equipment on which said transduced is used, and a movable part II sliding for example along an axis X and fixed to the movable member of the same equipment. The position transducer T may be of the type described in U.S. Pat. 2,799,835. This transducer comprises a pair of multipolar primary windings 3 and 4, phase shifted in the space and connected to the fixed part I and a multipolar secondary winding 5 fixed to the movable part II. As is well known, in such a position transducer the position of the movable part with respect to the fixed part can be represented by the relative displacement of the secondary winding with respect to the pair of primary windings, said displacement being represented as an angle measured in electrical degrees, bearing in mind that the polar pitch of the three windings, 3, 4, and 5, which corresponds to 360 electrical degrees is equal, for example, to 2 millimeters.

Position measuring transformer T compares the signals applied in analog form to its input terminals 7 and 8 and an analog magnitude applied to the independent input 6 and representing the position of movable part II and, hence, the position of secondary winding 5. Said analog magnitude is supplied by the movable member B of the equipment, e.g., a carriage equipped with a reference index and movable along sliding guides in a certain direction X. The movable member B in this embodiment may be connected to a movable part II through mechanical transmission means, and in this case, the analog magnitude applied to input 6 is represented by the present position of movable part II.

The position measuring transformer T is fed, via input terminals 7 and 8, to a digital-to-analog converter 9, which may be of any well known type, which, in turn, is fed by the internal counter 10. The converter 9 is suited to transform the digital information, which is applied, for example, in binary notation and in parallel form to its input terminals via a transfer channel 11, into an analog information represented by means of the sine and cosine functions of the electrical angle represented by said digital information, bearing in mind that the maximum number which can be represented by the internal counter 10 is equal to 360 electrical degrees and also to the polar pitch of windings 3, 4, and 5 of the transformer. More particularly, converter 9, upon being fed by a sinusoidal oscillator 12 having for instance a 10 kHz. Frequency supplies on output 7 feeding the fixed primary winding 3, a sinusoidal signal having a 10 kHz. frequency and a maximum amplitude proportional to the sine of said angle, and, on output 8 feeding the fixed winding 4 a sinusoidal signal having also a 10 kHz. frequency and a maximum amplitude proportional to the cosine of said angle.

Thus, on output terminal 13 a signal is obtained having also a 10 kHz. frequency and a maximum amplitude proportional to the difference between the present position of movable part II along axis X and the position represented by the digital information contained at present in the internal counter 10, with a phase shift of either 90° or 270° with respect to the oscillator signal, according to whether the sine of said difference is positive or negative. Based on these assumptions, it is understood that the present position is referred to each polar pitch and that said number represents a position in the presently occupied polar pitch.

The error signal on terminal 13 is passed through an amplifier 14 and transferred to input terminal 13 of a control unit 16 suited to control the counting operation of internal counter 10 in order to modify the digital information contained therein so as to substantially reduce to zero said analog signal. The error signal will be reduced to zero when said digital information corresponds to the present position of movable part 2.

A switch timing signal KM is composed of pulses obtained from the sinusoidal wave form oscillator 12. The latter also feeds a squaring circuit 38 which controls a pulse generating circuit 39 having two outputs KM and KC. Circuit 39 generates an output comprising a series of pulses occurring respectively at the points where the square wave from generator 38 crosses the zero line in descending direction; furthermore, the same circuit 39 is able to generate an output KC, which is a series of pulses occurring respectively at the points when the same wave form supplied on the output of the squaring circuit crosses the zero lines in ascending direction. The phase relationship of the pulses with the output from terminal 13 operates control unit 16 to determine which of the outputs therefrom will be used, and this depends upon whether or not the error signal has a positive or negative sine.

Outputs A and I are selectively operated by control unit 16 to allow the forward and backward counting of internal counter 10. The hundreds and tens decades, 10C and 10D are shown in this embodiment. Outputs C and D of control unit 16 are selectively energized by the control unit to control the opening of gates 40 and 41, respectively, which control decades 10D and 10C of the internal counter.

The pulses KC apply to both gates 40 and 41, and through these gates they control the counting operation of internal counter 10. Therefore, for each period of wave form generated by oscillator 12, circuit 39 supplies a pulse KC which controls the counting operation of one of the decades of counter 10, according to the results of the control operations accomplished on the error signal by control unit 16 at the instant defined by the switch timing pulse KM pertaining to the same period. In order that a pulse KC fed to internal counter 10 may be effective to cause it to count, it is essential that one of the two gates 40 or 41 be open so as to condition a counter for forward or backward counting. Each effective pulse KC produces a change of the digital contents of counter 10 and, consequently, a change of the analog signals on outputs 7 and 8; said signals now represent the respective functions, sine and cosine, of the new digital number present in the counter. In this way a new analog error signal will also appear on output 13 of the position measuring transformer T. The new signal will still be a sinusoidal voltage having a frequency of 10 kHz., a maximum amplitude which is proportional to the difference between the present position of movable part II along its displacement axis X, and the position represented by the new digital number present in counter 10, and a phase displacement of either 90° or 270° with respect to the signal of oscillator 12 according to the polarity of said difference. The operation described hereinabove is a continuous one so that the system will also seek to approach a balanced condition, particularly when part II is stopped.

Such measurement is possible when the movable member stays stationary in any position along the relevant displacement axis.

In FIG. 2 a display device V of known type is represented, which has a number of reading positions equal to the number of the stages of the external counter 42. In the example of FIG. 2 the reading positions are four, corresponding to and directly controlled by the four stages 42C, 42D, 42U respectively 42E, each one of said positions being apt to supply a visual representation of the decimal digit contained in the corresponding stage of the external counter 42.

Furthermore, in FIG. 2 four selectors RR, 47, 48 and RA, are represented, each one comprising four positions RE, RD, ID, NO, simultaneously and manually operable by means of a single knob.

The selector RR on the position RE connects the stages of the internal counter 10 to a constant voltage VO which rests to zero the digital contents of said counter 10. The other three positions RD, ID, NO of the selector RR are free of connections.

The selectors 47 and 48 on the positions RD and NO, by connecting digital to analog outputs 7, 8 of the converter 9 to the windings 3 and IV 4 of the fixed member 1, close the loop of the feedback encoder comprising the counter 10, the converter 9, the position measuring transformer T, the amplifier 14 and the control unit 16. In the position RE, ID the selectors 47 and 48 maintain open the loop of said servo-system.

Finally, the selector RA in the position RE connects the stages of the external counter to the constant voltage VO which zeroizes the digital contents of this counter and therefore also of the visualizer V parallelly connected thereto. The other positions RD, ID, NO of the selector RA are free of connections.

In normal conditions the four selectors RR, 47, 48 and RA are located on the position NO.

Assuming that the movable member B of the digital position measuring device MP is stationary in a determined position P (FIG. 1), and that therewith also the movable member 2 of the position measuring transformer T, which is connected to B through a mechanical connection 6, is also stationary, and that the control equipment of the digital position measuring device MP is energized, the feedback encoder takes up a balance condition, wherein the digital contents of the internal counter 10 represent the present position of the movable member 2 with respect to the zero position R6 of the fixed member 1. Conversely, the external counter 42 will generally have different digital contents.

When a visual digital indication of the position of the movable member B within a pitch of the position measuring transformer T is requested, the contents of the external counter 42 are reset to zero in order to transfer therein the digital contents of the internal counter 10 and therefore to obtain a visual representation by means of the visualizer V.

To do this the selectors are set on the position RE, thus causing the breaking of the servo-system loop and the zeroizing of both counters 10 and 42. Then, the selectors are set on the position RD, so restoring the closed loop of the servo-system, so that the error signal, originated at the output 13 of the position measuring transformer T, controls the counting operation of the two counters 10 and 42 through the control unit 16 so as to produce a progressive annulment of the error. The balance condition is reached when the digital contents of the internal counter 10 represent the actual pitch $x$P of the movable member within one pitch.

In such conditions, owing to the identical starting condition, the external counter 42 has digital contents which are equal to the ones of the internal counter 10.

It will be noted, with reference to the FIG. 1, that if P represents the position of the movable number B within the pitch $p7$ of the position measuring transformer T, the initial zeroizing operation of the counters sets the counter 10 in a digital condition representing either the zero position R6 or the zero position R7. When the loop of the servo-system is closed, the counter 10 starts counting till reaching the balance magnitude $x$P. The internal counter 10 may count forward and backward, and the counting operation is carried out so as to reach the magnitude $x$P following the shortest way, and therefore in the shortest time, i.e., starting from the one of the two zeros R6 and R7 which is closer to P. If the counting operation proceeds from R6 toward P, namely if it is a progressive counting, the control unit 16 energizes the channel A controlling the forward counting operation, whereas if the counting operation proceeds from R7 to P, namely if it is a regressive counting, starting from the maximum magnitude that the counter may contain, the control unit 16 energizes the channel I controlling the backward counting operation.

The external counter 42 may operate in a manner identical to the internal counter 10. However if it is requested that said external counter be provided with means for setting up the contents and the sign thereof, it will be convenient that, when it starts from zero and the control unit 16 controls a backward counting operation, it operates as a progressive counter with minus sign. The consequence is that, in the presence of the backward counting conditions, when the balance condition of the loop of the feedback encoder is reached the external counter 42 will contain a negative magnitude equal to the complement of the magnitude contained by the internal counter 10. That is, with reference to FIG. 1 and in the aforesaid balance conditions, the internal counter 10 will contain a magnitude representing the relative coordinate $x$P, while the external counter will contain a magnitude having a sign equal to $-(p-x\text{P})$. By reading this latter magnitude on the visualizer V, the skilled operator will be able, in this case, to immediately deduce the magnitude of the relative coordinate xP.

Successively, the selectors RR, 47, 48 and RA are set on the position ID, wherein the loop of the servo-system is open and the internal counter 10 keeps unchanged its digital contents. In this condition the contents of the external counter 42 may be modified by introducing, by means of the already mentioned means, the magnitude XP or any other selected starting magnitude.

The selectors are then set on the position NO, wherein the loop of the servo-system is closed again and the digital position measuring device MP is then set in the normal operation conditions.

It is to be added that suitable means are provided for preventing that, in the case of measurement of a position P exactly located in the center of a pitch, the counter 10 from remaining after the initial zero reset operation in that condition in which a null error on the output 13 of the position measuring transformer T, however does not represent the magnitude of the relative coordinate xP.

In a second embodiment of the invention illustrated in FIG. 3, the digital position measuring device MP additionally comprises four selectors 49, 50, 51, 52, each one comprising four positions RE, IE, EI and NO simultaneously and manually operable by means of a single knob.

In the positions RE and NO the selector 49 connects the output 13 of the position measuring transformer T to the input of the amplifier 14 keeping closed the loop of the servo-system, whereas in the positions IE and EI said loop remains open.

In the positions IE and EI the selector 50, by connecting the conductors 53 and respectively 54 to a constant voltage source V1, maintains energized the gates 57 and respectively 58. The output 61, 62 of each gate 57, respectively 58, is energized when also the input 59, respectively 60, is energized and in such conditions the gate 41 is activated, so allowing the transmission of pulses from the oscillator 12 to the counters 10 and 42. The conductors 59 and 60 are energized only throughout the time wherein the digital contents of the counters 10 respectively 42 are other than zero. In the positions RE and NO the selector 50 does not perform any connection.

In the positions IE and EI, the selector 51, by connecting the wires 55 and respectively 56 to a constant voltage source V2, keeps energized the inputs A and I of the two counters 10 and 42 for the forward and for the backward counting operations. In the positions RE and NO the selector 51 does not perform any connection.

Finally, the selector 52 (analogous to the selector RA of FIG. 2) in the position RE connects the stages of the external counter 42 to the constant voltage VO, which zeroizes the digital contents of this counter and, therefore, also of the visualizer V which is parallelly connected thereto. The other three positions IE, EI and NO of the selector 52 are free from connections.

In normal conditions the four selectors 49, 50, 51 and 52 are set upon the position NO.

Assuming that the movable member B of the digital positions measuring device MP is staying on a predetermined position P (FIG. 1), the initial conditions, already described with reference to the embodiment of FIG. 2, exist in the system. When a visual indication of the position of the movable member B within the range of the pitch p7 of the position measuring transformer T is required, the following procedure is to be followed.

Initially, the selectors 49, 50, 51 and 52 are set on the position RE, thus zeroizing the external counter 42.

Successively the selectors are set on the position IE, thus causing the opening of the servo-system loop and the activation of the gate 57. The presence of digital contents in the counter 10 energizes the wire 59 and, therefore, also the output 61 of the gate 57 becomes energized, whereby the gate 41 is activated. In such conditions the oscillator 12, through the gate 41, sends pulses, which by means of the wire 44 are simultaneously injected into both counters 10 and 42 and, as said selector 51 energizes the line I which controls the backward counting operation of said counters, said pulses progressively reduce the digital contents of the internal counter 10 and progressively increase the digital contents of the external counter 42 starting from a zero having negative sign.

The counting operation of the two counters 10 and 42 is stopped when the counter 10 reaches the zero condition, which deenergizes the conductor 59 and therefore deactivates the gates 37 and 41. In such conditions the digital contents of the external counter 42 are equal (with negative sign) to the initial contents of the counter 10, namely in the position IE of the selectors the digital contents of the internal counter 10 are transferred to the external counter 42. Therefore, the reading on the visualizer V (neglecting the sign) supplies the digital indication of the coordinate xP of the position of the movable member B.

When said indication is read and written out, the four selectors are set on the position EI, wherein the loop of the feedback encoder is still open and the gates 58 and 43 are activated, as the wires 54 and 60 are energized. In such conditions the oscillator 12 through the gate 41 transmits pulses, which by means of the wire 44 are simultaneously injected into both counters 10 and 42 and, since the selector 51 energizes the line A which controls the forward counting operation of said counters, said pulses progressively reduce the digital contents of the external counter 42 (since it has negative sign) and progressively increase the digital contents of the internal counter 10 starting from zero.

The counting operation of the two counters 10 and 42 is stopped when the counter 42 reaches the zero condition, which deenergizes the wire 60 and therefore deactivates the gates 58 and 41. In such conditions the internal counter 10 has taken again its initial digital contents, namely in the position EI of the selectors the digital contents of the external counter 42 are transferred to the internal counter 10.

Then the selectors are to be set on the position NO, wherein the loop of the servo-system is closed again and the digital position measuring device MP is now in its normal operative conditions.

If then the indication of the absolute coordinate XP is required to appear on the visualizer V, as already previously described, the operator will utilize the relation (1), wherein $\Delta$ and $p$ are known constructive data, xP has been measured by means of the operations previously described and $n$ is read on a gradulated scale rigidly secured to the fixed member 1. The external counter 42 is provided with means operable to produce resetting or shifting operations and with means for automatically changing the sense of the count when counting crosses zero. The counter can operate either as an absolute or as an incremental counter. Therefore, in the position measuring device according to the invention the following operations are possible: Shifting of the reference point, inversion of the positive sense of an axis, counting always in direct form and the latter with no need for recomplementing the contents of the external counter.

For both embodiments here described it may be observed that at the end of the described initial operations the digital contents of the internal counter 10 remain unchanged if during said initial operations the movable member has not been displaced; conversely if small displacements due to accidental causes occur, when the final closure of the loop of the servo-system take place, the selectors being on the position NO, the internal counter 10 changes its digital contents so as to reestablish the balance of the system, and simultaneously also the external counter 42 changes its digital contents by the same amount. Therefore, the procedure for measuring the relative coordinate, as previously described, does not lose its meaning even in the presence of these small accidental displacements.

What I claim is:

1. In a digital position measuring device for measuring the displacement of a movable member with respect to a fixed member, along an axis provided with a series of position zeros spaced by a constant pitch:
a first counter whose digital contents represents the relative position of the movable member within each one of said pitches,
a second counter adapted to count in a manner identical to the said first counter and having a greater content for maintaining a cumulative count,
a display device connected to said second counter for displaying the digital contents thereof,
a digital to analog converter fed by said first counter for converting said contents into a first analog magnitude,
means for supplying a second analog magnitude representing the instantaneous position of said movable member,
means for continuously comparing said first and second analog magnitudes to supply an error signal representing the difference between said first and second analog magnitude,
means generating a series of counting pulses at a predetermined frequency,
means fed by said pulse generating means and applying pulses simultaneously to said first and second counters through a gate,
a control unit fed by said comparing means for keeping open said gate when said error signal is present
and means for entering the digital contents of said first counter into second counter in order to allow the visual representation in said display device of the relative position of said movable member within the currently occupied one of said pitches.

2. The device defined in claim 1 wherein said first counter, said digital to analog converter, said comparing means and said control means constitute a closed loop feedback encoder and comprising in addition
a manually operable device which in a first operation step is adapted to break said loop and to reset to zero the contents of said first and second counters and in a second operation step is adapted to remake said loop.

3. The device defined in claim 2 wherein said manually operable device in a first operation step is adapted to reset to zero the contents of said second counter and in a second operation step is adapted to break and loop and to cause said second counter to progressively cunt and to cause said second counter to regressively count until zero is reached.

References Cited

UNITED STATES PATENTS

| | | | |
|---|---|---|---|
| 2,836,356 | 5/1958 | Forrest et al. | 340—347 X |
| 2,873,439 | 2/1959 | Lahti et al. | 340—347 |
| 2,943,237 | 6/1960 | Bell | 340—347 X |
| 3,007,637 | 11/1961 | Meirowitz | 235—92 |
| 3,234,544 | 2/1966 | Marenholtz | 340—347 |
| 3,261,012 | 7/1966 | Bentley | 340—347 |
| 3,315,253 | 4/1967 | Geller | 340—347 |
| 3,319,054 | 5/1967 | Kelling | 235—92 X |
| 3,350,708 | 10/1967 | Adler | 340—347 |
| 3,436,753 | 4/1969 | Walker et al. | 340—347 |

MAYNARD R. WILBUR, Primary Examiner

G. R. EDWARDS, Assistant Examiner